Figure 1:
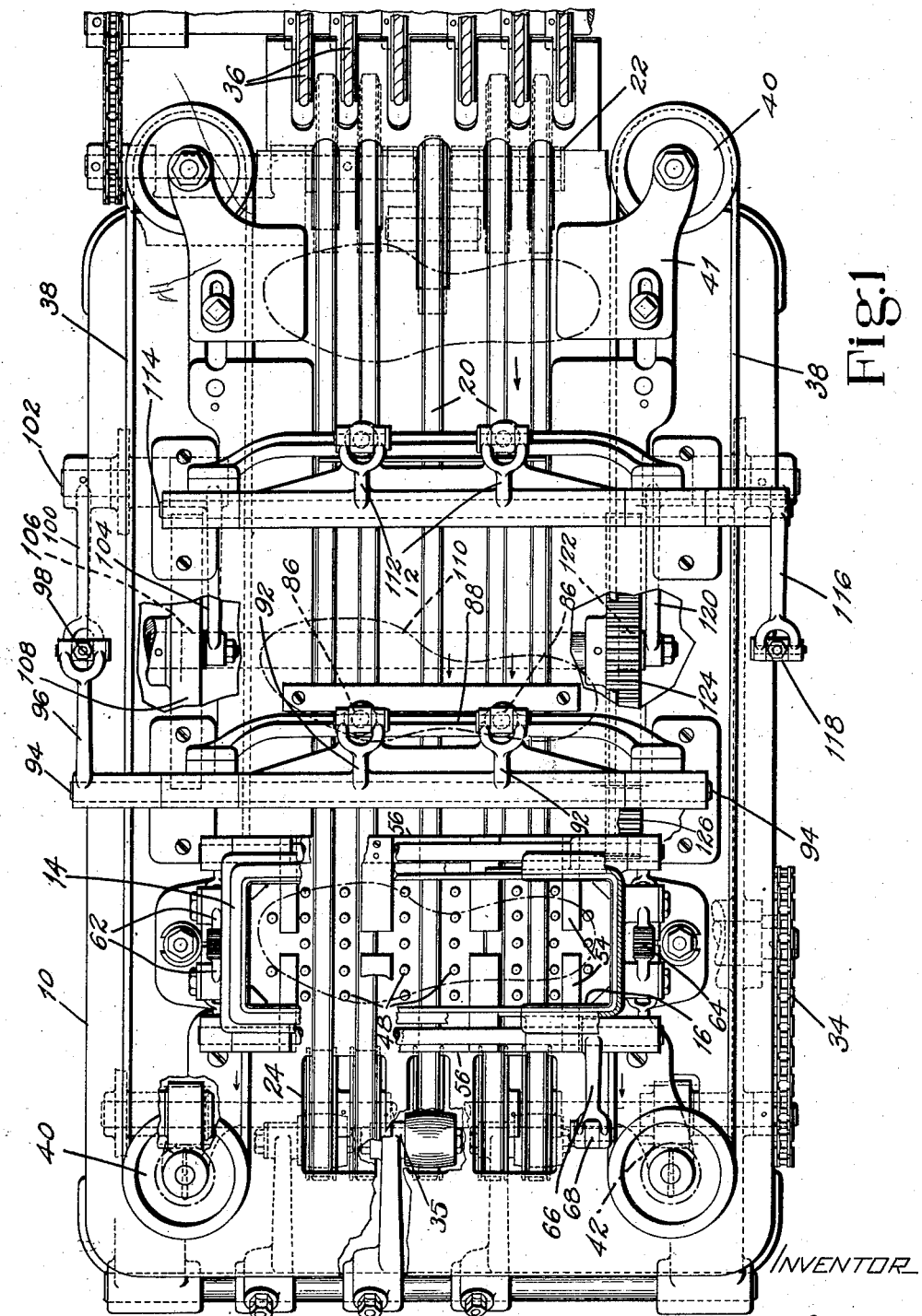

Patented Mar. 29, 1932                                    1,851,454

UNITED STATES PATENT OFFICE

RALPH C. SIMMONS, OF BEVERLY, MASSACHUSETTS, ASSIGNOR TO UNITED SHOE MACHINERY CORPORATION, OF PATERSON, NEW JERSEY, A CORPORATION OF NEW JERSEY

STACKING APPARATUS

Application filed January 11, 1928. Serial No. 245,943.

My invention relates to apparatus for forming various articles into piles or stacks, it being herein illustrated as applied to the arranging of sole-portions, as those of insoles, in a magazine.

In some machines employed in the making of soles, it may be desired to supply them with portions upon which they are to operate in stacks contained in magazines. For example, it is convenient to handle in this way the layers which are to be included in composite insoles. An object of the invention is to provide for thus stacking articles automatically and with speed and accuracy, regardless of the rate at which they are received. In attaining this object, I utilize, in novel combinations, stacking means, which may be in the form of an elevating member or members, and means for delivering to the stacking means, there co-operating with the delivering means other means contacting with the articles, herein shown as gates movable relatively to the delivering means, for controlling the delivery of articles. This article-controlling means may be so operated in definite time-relation to the stacking means that, although the latter may be in motion, articles will be delivered to it only at predetermined times, when it is in the proper receiving relation. There is thus assured the orderly performance upon each article of the stacking operation. It is also desired to dispose the articles in a definite position upon the delivering means to receive the action of the stacking means. Soles or sole-portions should have their longitudinal axes so positioned that they correctly enter a magazine elongated in one of its transverse dimensions. My improved apparatus includes means for effecting this positioning action, preferably by contact of the articles upon the delivering means with a gate or gates, which arrest them, or with the stacking means itself. When plural gates are used, there is obtained a successive control of the articles delivered from one gate to another, and by the final gate to the stacking means, and also a series of positioning effects making more certain the proper presentation of the articles to the magazine. To prevent lateral displacement of the articles from the traveling delivering means, there may be retaining means at its opposite sides, and to avoid disturbance of articles after they have been positioned, this retaining means travels with the delivering means between the positioning means and the stacking means. To maintain the accumulating articles in the stack, and at the same time allow their successive reception, I provide a stack-support movable into and out of the path of articles which are under the influence of the stacking or elevating member, and means for moving this in definite time-relation to said member. This supporting means travels horizontally, and is withdrawn from the path of the elevating member as this delivers articles to the stack, and then is returned to support said stack. It is illustrated as including members movable oppositely.

Figure 2:
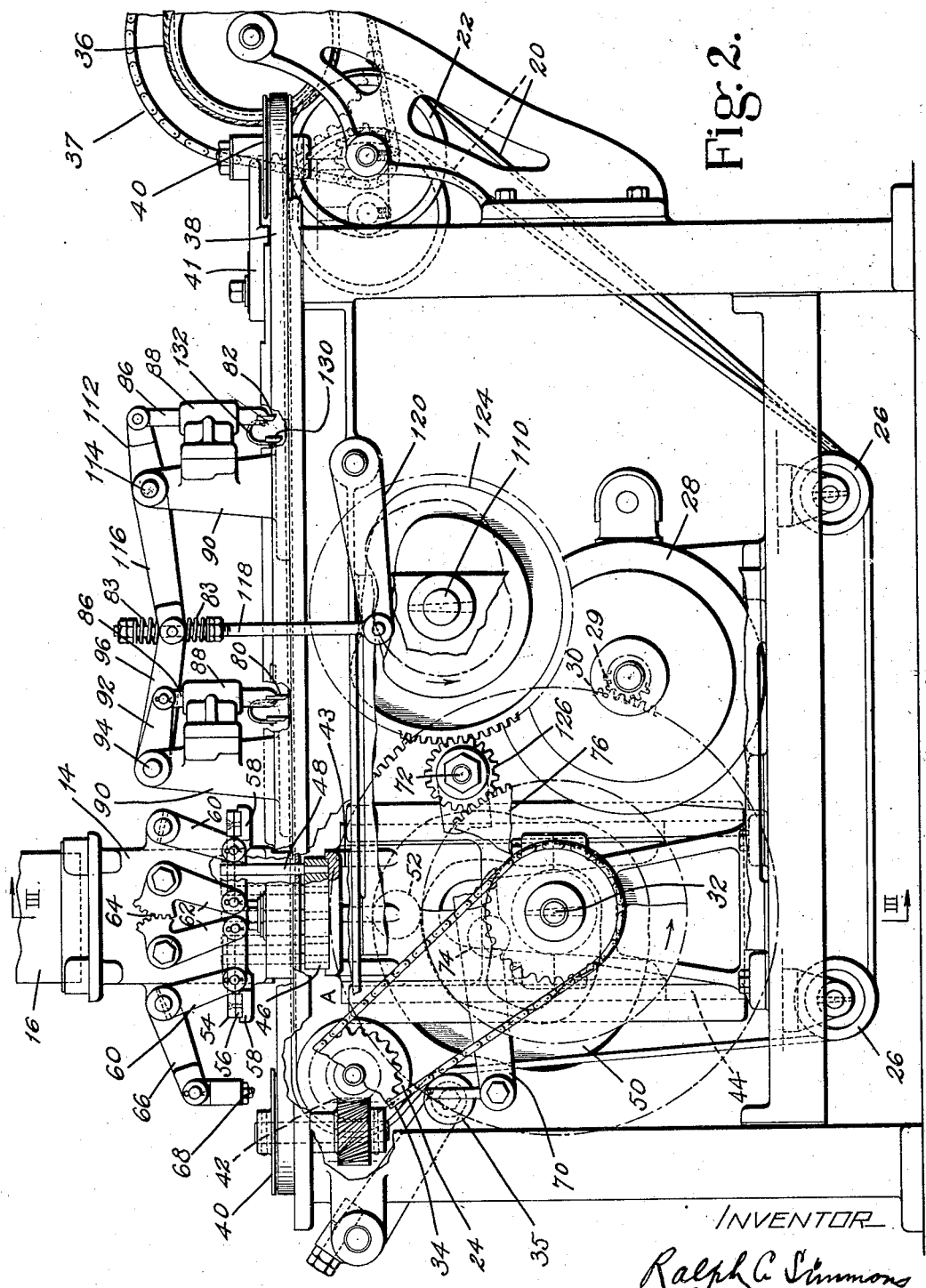
Figure 3:
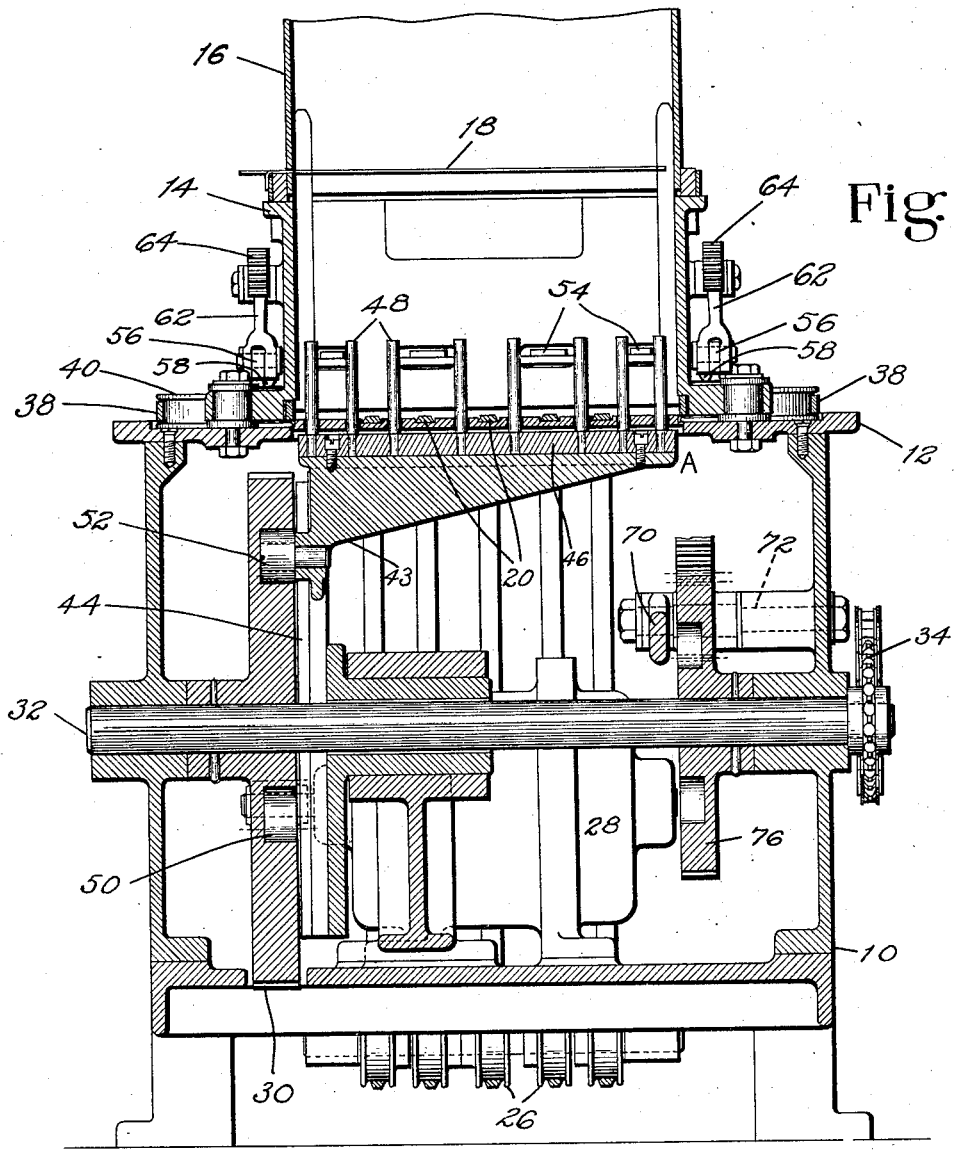

The accompanying drawings illustrate a particular embodiment of my invention adapted for the stacking of insole-portions, Fig. 1 being a top plan view thereof;
Fig. 2, a side elevation; and
Fig. 3, a transverse vertical section on the line III—III of Fig. 2.

At the top of a frame 10 (Fig. 3) is a horizontal table 12, from near one extremity of which rises a casing 14. At its top, this casing is arranged to receive a vertically extending magazine-tube 16, which may be of sheet-metal, and the lower extremity of which may be closed by a slide 18 to facilitate the removal of the tube when it has been filled. Both the casing and the tube are rectangular in horizontal section, and are elongated transversely of the table to receive, in the present instance, such insole-portions as thin leather blanks, with their longitudinal axes lying in the direction of this maximum dimension.

The articles to be stacked are delivered to the bottom of the casing by a primary conveyor, shown as consisting of a series of separated belts 20, running in grooves in the table beneath the magazine, and being supported upon rolls 22 and 24 at its opposite extremities and rolls 26, 26 at the bottom of the frame. The conveyor-belts are driven continuously in the direction of the arrow in Fig. 1 by a motor 28, which may be electrical. Power is transmitted through a pinion 29 on the shaft of the motor, a gear 30 on a shaft 32 journaled transversely of the frame, and sprocket-gearing 34, the latter connecting the shaft 32 to the shaft carrying the rolls 24. Tighteners 35 may be used to maintain the belts 20 under the desired tension. To these belts the work-pieces are brought by a secondary conveyor 36, which may be one upon which they have been carried for a considerable distance, so that an adhesive with which they have been coated has been allowed to at least partially dry. I have shown the conveyor 36 as driven from the adjacent shaft of rolls 22 by sprocket-gearing 37 at a speed considerably less than that of the conveyor 20. Therefore, when each article is dropped upon the last-mentioned conveyor, it is at once carried away and spaced from the succeeding article, which has not yet left the conveyor 36. Moving at each side of the conveyor 20 is a belt 38, which passes over rolls 40, 40 turning about vertical axes near the extremities of the table. The brackets 41 upon which the rolls at one end of the belts 38 are mounted may be adjustable upon the frame to enable the proper tension to be maintained. The belts 38 are driven at substantially the speed of the conveyor-belts through spiral-gearing 42 from the driven shaft of the rolls 24. It will be seen that the belts 38 furnish traveling walls at each side of the conveyor 20, retaining articles upon the latter without danger of their displacement by relative movement. That is, an article positioned upon the conveyor will remain in the desired relation even if in contact with one of the walls 38. This is of especial importance with light, flaccid objects like the thin layers of insoles.

To raise articles from the conveyor 20 to form a stack in the casing 14 and tube 16, an elevating device A is provided. This includes a slide 43 movable in vertical ways 44 at one side of the frame and carrying a horizontal plate 46, which extends beneath the magazine. Set in the plate are vertical pins 48 furnishing elevating or stacking members, these pins passing through openings in the table and being so spaced transversely as to lie between the belts 20. Longitudinally of the table, their spacing is such as to afford support for the smallest articles to be stacked. Vertical travel is imparted to the pins, so that they move from a position in which their upper ends are just beneath the conveying surfaces of the belts 20 to one at which these ends are within the casing 14 above said belts, by a cam-groove 50 formed in the gear 30 and engaged by a roll 52 mounted upon the outer side of the slide 42. This elevation and depression of the pins goes on continuously during the operation of the apparatus.

To retain the elevated articles in the stack when the pins descend from the casing, supporting fingers 54 are movable horizontally through openings in said casing. The fingers are preferably arranged in two sets, at the front and rear of the casing, and extend between the longitudinal series of elevating pins. Each set is carried by a transverse bar 56 fixed at each extremity upon a carrier 58 hung upon a pair of links 60, 62 pivoted upon the casing. The links 62 are geared together at 64, so that the fingers move oppositely, alternately approaching and receding from each other. Turning with one pair of links 60 is an arm 66 joined by a connecting rod 68 to a lever 70 fulcrumed upon a stud 72 projecting from the side of the frame. The lever carries a roll 74 entering a groove in a cam-disk 76 fast upon the shaft 32. The time-relation between the movements of the elevating pins and the supporting fingers may be as follows, it existing for each article stacked: Assuming the pins to be at the lowest point in their reciprocation, the ends of the opposite sets of fingers will be in proximity to one another, thus extending beneath the stack in the casing and tube and supporting it. An article being delivered above the pins by the conveyor 20, said pins rise, and, as the article they bear approaches the under sides of the fingers, these separate rapidly, giving a space through which the article is forced against the bottom of the stack, the weight of which is now carried by the pins. Movement of the pins being reversed so that they descend, the fingers are quickly thrust between them beneath the stack, furnishing a support for it as the pins leave it to elevate the succeeding article. Since the supporting means is positively actuated and no pressure is exerted by the stacked articles to effect the movement, there is no danger of such articles becoming deforming or displaced in the stack during their introduction.

The operating cycle of the pins and fingers just described substantially agrees with the rate at which the articles are delivered by the conveyor 20. There must, however, be such exactness of relation between this feed and the elevating action of the pins that articles will not be caught in the ascent of the pins between them and the edge of the casing beneath which they enter. I therefore arrange to deliver the articles to the elevating device at a time when the pins are across their path, and prevent their delivery as the pins are rising from beneath the conveyor 20. To this end, controlling means is provided in the form of a gate 80 movable toward and from the conveyor-belts 20 to alternately stop and release the advancing articles. The gate also has a positioning function as to the angular relation of the articles upon the conveyor. I prefer to employ a plurality of these gates, a second being shown at 82, which controls the delivery to its companion and also acts to shift articles angularly. These gates 80 and 82 are respectively mounted upon vertically movable slides 86, of which two are illustrated, guided in a yoke 88 connecting standards 90, 90 rising from opposite sides of the frame. The gate 80 has joined to its slides arms 92 fixed upon a shaft 94 turning in its standards. An arm 96 and link 98 connect this shaft to an arm 100 fast upon a shaft 102 journaled in the frame beneath the table. An arm 104 upon shaft 102 has a roll 106 operating in a groove in a cam-disk 108 secured to a transverse shaft 110. The gate 82 is similarly joined through arms 112, shaft 114, arm 116, link 118, lever 120 and roll 122 to a groove in a cam-disk 124 also fixed to the shaft 110. This shaft 110 is rotated through gear-teeth upon the periphery of the disk 124, which mesh with an idler pinion 126 rotatable upon the stud 72 and engaging, in turn, teeth about the cam-disk 76. The gates are so operated by their cams that they move simultaneously in opposite directions, one being open while the other is closed. Because both the belts 20 and the articles they convey may vary in thickness, the gates 80 and 82 are arranged to yield vertically, springs 83 being interposed between their links 98 and 118 and the levers which they actuate. The rate at which each gate completes a cycle of movement is greater than that at which articles can be delivered by the secondary conveyor 36. There being a predetermined time-relation between the action of the inner gate 80 and the elevating pins, the articles are held by the former while the pins are depressed, being preferably released by the rise of the gate just as the descent of the pins is beginning. The conveyor-belts 20, moving at a relatively high rate of speed, at once carry the freed articles against the pins where they are held by the conveyor until the upper extremities of said pins pass below the article. Thus released, this article is advanced by the conveyor into the casing above the pins, being retained until elevation by the contact of its forward edge with the casing-wall. As the gate 80 is releasing an article, the gate 82 is closed to retain the succeeding article until 80 again closes, whereupon 82 rises for a sufficient length of time to free a single article.

Because the articles upon which the present apparatus is intended to operate are elongated in one direction, and since the casing and magazine-tube are arranged with the maximum horizontal dimension lying transversely of the conveyor 20, the apparatus has means for adjusting the position of the articles upon the conveyor, this means consisting preferably of the gates, elevating pins and the forward casing-wall. If an article, when it is stopped by one of these devices, is displaced angularly so that its longitudinal axis is not substantially at right angles to its direction of advance, the drag of the belts 20 upon the article as its forward extremity rests against the member which has arrested it will cause the turning of its free end toward the stop member. The effect of this will depend upon the length of time the belts have to act upon the partially arrested article. But after this action has occurred two or three times, as at one or both of the gates, at the pins and inside the casing, it is reasonably certain that the desired transverse relation will have been attained, and that an insole, for example, will rest with both its heel and toe-portions in engagement with the pins when these are depressed to receive it for elevation into the stack. It may be found that, if a single gate stops the travel of an article by descending upon it rather than in its path, the frictional effect of the belts 20 will act to turn the article beneath the gate. This causes a departure from the proper angular relation, as just described, which it might be impossible to fully correct at the later-acting devices. To prevent this, each of the gates is shown as having associated with it a second gate-portion 130, which may extend somewhat lower than its companion and may be mounted upon a spring-support 132. With this arrangement, if one of the gates contacts with the upper face of an article, the portion 130 engages it and then yields to permit contact of the associated member. Now, the gate will bear upon at least two separated points and thus prevent rotation of the article. The correction of its angular position, if this is required, may then be effected at the succeeding devices.

To outline the general operation of the apparatus, it may be said that insole-portions or other articles are delivered one by one from the conveyor 36 to the conveyor 20. The latter carries each article quickly away from the following articles upon the more slowly traveling conveyor 36, giving an uninterrupted period during which the gates may act. The thus-separated article is stopped by the gate 82, if this be depressed, or by the gate 80, if this be in the receiving relation. In the former condition, if the article is not situated with its longitudinal axis at substantially right angles to the direction of advance, the contact with the gate 82 will wholly or partially correct this. When the gate 80 is lowered, 82 will rise long enough to permit the forwarding of the article into contact with the gate 80, where a further correction of the angular position may be made. Had the gate 82 been raised, the article would have passed at once to the gate 80. In either case, if the contact of the gate with the article occurs over the upper face, the plural portions will hold it against displacement as a result of the movement of the conveyor while it is thus retained. If the article is at one side of the conveyor, so that its extremity rests against a belt 38, there will be no displacing tendency, on account of the equal rate of travel of the belts 20 and 38. The time-relation between the elevation of the gate 80 and the descent of the pins 48 from the position of the latter illustrated in Fig. 2 of the drawings is such that the freed article is carried against the sides of the pins 48 while these are still being lowered. As a result of this, as soon as the upper extremities of these pins are beneath the conveying surface, the article is carried beneath the casing against its forward wall, and there held for the rise of the pins, which at once follows. At both the pins and casing-wall there is afforded an opportunity for further angular positioning. As the ascending article approaches the under side of the fingers 54, these are withdrawn, and the pins now supporting both this article and the remainder of the stack carry these above the fingers. Thereupon, the movement is reversed, the pins being lowered and the fingers carried in beneath the stack in preparation for the reception of the succeeding article. When a sufficient number of the articles has accumulated within the tube 16, this may be removed and applied to the machine which is to be fed.

Having described my invention, what I claim as new and desire to secure by Letters Patent of the United States is:

1. In a stacking apparatus, a stacking member movable vertically to receive and arrange articles resting one upon another, means for delivering the articles to the member, and means movable relatively to the delivering means and engaging articles thereon to control their delivery.

2. In a stacking apparatus, a stacking member movable vertically to receive and arrange articles resting one upon another, means for delivering articles to the member, means coöperating with the delivering means for limiting the delivery to predetermined times, and driving means for operating the stacking member and limiting means in definite time-relation.

3. In a stacking apparatus, a movable stacking member, a conveyor having a traveling surface delivering to the stacking member, and a plurality of gates situated above and movable toward and from the conveying surface and each provided with a plurality of article-engaging projections, said gates being arranged to act successively upon the articles carried by the conveyor.

4. In a stacking apparatus, a movable stacking member, an endless conveyor delivering to the stacking member, a plurality of gates movable above and toward and from the conveyor and arranged to act successively upon the articles thereon, and means arranged to move adjacent gates in alternation.

5. In a stacking apparatus, means movable to arrange articles in a stack, means for delivering the articles to the stacking means, and means movable relatively to the delivering means and provided with plural portions arranged to engage simultaneously faces of articles at points spaced from one another, one of said engaging means being yieldable independently of the associated engaging means.

6. In a stacking apparatus, means movable to arrange articles in a stack, means for delivering the articles to the stacking means, and a member movable relatively to the delivering means and provided with plural portions arranged to engage articles at points spaced from one another upon the member, one of said portions being yieldably mounted.

7. In a stacking apparatus, a movable stacking member, a conveyor delivering to the stacking member, and a yieldable gate movable toward and from the conveyor and having a plurality of article-engaging portions spaced from one another in the direction of advance of the articles, one of said portions being yieldable upon the gate.

8. In a stacking apparatus, a movable stacking member, a conveyor delivering to the stacking member, a gate movable toward and from the conveyor and having a plurality of article-engaging portions spaced from one another in the direction of advance of the articles, and a spring upon which one of the portions is mounted.

9. The combination with a magazine, of a conveyor movable beneath the magazine, a stacking member reciprocating from below the conveying surface into the magazine, and a gate movable in co-operation with the conveyor to arrest the advance of articles thereby.

10. The combination with a magazine, of a conveyor movable beneath the magazine, a stacking member reciprocating from below the conveying surface into the magazine, a gate movable in co-operation with the conveyor to arrest the advance of articles thereby, and means for lowering the gate to stop articles upon the conveyor while the stacking member is lowered.

11. The combination with a magazine, of a conveyor movable beneath the magazine, a stacking member reciprocating from below the conveying surface into the magazine, gates successively arranged along the conveyor to change the relation of articles thereon, and means arranged to simultaneously lower one gate and raise another.

12. The combination with a magazine, of a conveyor movable beneath the magazine, a stacking member reciprocating from below the conveying surface into the magazine, gates successively arranged along the conveyor, and means arranged to lower the gate nearest the stacking member when this is lowered and to raise the succeeding gate.

13. In a stacking apparatus, a horizontally reciprocating stack-support, an elevating member arranged to carry an article and movable to deliver said article to a point above the support, and means arranged to withdraw the support from the path of the elevating member during the movement of said member.

14. In a stacking apparatus, a movable stack-support, a movable stacking member delivering to the support, continuously operating means delivering articles to the stacking member, means co-operating with the delivery means for controlling the delivery of articles thereby, and means for operating the support, stacking member and controlling means in definite time-relation.

15. In a stacking apparatus, a plurality of article-elevating members spaced from one another, and a plurality of supports movable in the spaces between the members, said supports carrying the elevated articles resting upon one another in a stack.

16. In a stacking apparatus, a plurality of article-elevating members spaced from one another, a plurality of supports movable in the spaces between the members, said supports carrying the elevated articles resting upon one another in a stack, and means for operating the elevating members and stack-supports in definite time-relation.

17. In a stacking apparatus, a plurality of vertically-extending elevating members spaced laterally from one another, and opposite sets of stack-supporting fingers movable in the spaces between the members.

18. In a stacking apparatus, a plurality of elevating members spaced from one another, opposite sets of stack-supporting fingers movable in the spaces between the members, links carrying the fingers, and connections between the links of the opposite sets to compel them to move oppositely.

19. In a stacking apparatus, a plurality of elevating members spaced from one another, a plurality of stack-supports movable in the spaces between the members, and a plurality of conveyor-belts movable in said spaces.

20. In a stacking apparatus, a plurality of elevating members spaced from one another, a plurality of stack-supports movable in the spaces between the members, a plurality of conveyor-belts movable in said spaces, and a gate movable into and out of the path of the articles upon the belts.

21. In a stacking apparatus, a plurality of elevating members spaced from one another, a plurality of stack-supports movable in the spaces between the members, a plurality of conveyor-belts movable in said spaces, a gate movable into and out of the path of the articles upon the belts, and means for operating the elevating members and gate in definite time-relation.

22. In a stacking apparatus, a plurality of elevating members spaced from one another, a plurality of stack-supports movable in the spaces between the members, a plurality of conveyor-belts movable in said spaces, gates co-operating with the belts, and means for moving said gates alternately to stop and release articles upon the belts.

23. In a stacking apparatus, means for arranging articles in a stack, traveling means for delivering the articles to the stacking means, means co-operating with the articles on the delivering means and arranged to position said articles thereon, and article-retaining means traveling with the delivering means between the positioning means and the stack-arranging means.

24. In a stacking apparatus, means for arranging articles in a stack, traveling means for delivering the articles to the stacking means, means arranged to stop the advance of the articles by the delivering means and to position said articles in a definite angular relation thereon, and retaining walls traveling with the positioned articles at opposite sides of the delivering means between the positioning means and the stack-arranging means.

25. In a stacking apparatus, an elevating member, a stack-support co-operating with the member, a conveyor-belt delivering to the elevating member, a gate movable into and out of the path of the articles upon the conveyor-belt, and belts furnishing retaining walls at opposite sides of the conveyor-belt between the gate and elevating member.

In testimony whereof I have signed my name to this specification.

RALPH C. SIMMONS.